United States Patent [19]
Fisher

[11] 4,254,441

[45] Mar. 3, 1981

[54] DIGITAL CODE READER

[76] Inventor: Alan J. Fisher, 5711 Tannahill Cir., Huntsville, Ala. 35802

[21] Appl. No.: 13,907

[22] Filed: Feb. 22, 1979

Related U.S. Application Data

[62] Division of Ser. No. 772,081, Feb. 25, 1977, Pat. No. 4,141,494.

[51] Int. Cl.³ .................... H04N 9/54; G06K 7/08; G06K 13/00; G11B 25/04
[52] U.S. Cl. .................... 360/88; 235/449; 235/482; 360/2
[58] Field of Search .................... 235/449, 450, 482; 360/2, 88, 104

[56] References Cited
U.S. PATENT DOCUMENTS

| | | | |
|---|---|---|---|
| 3,422,411 | 1/1969 | Smith, Jr. | 360/88 |
| 3,626,158 | 12/1971 | Lawrence | 360/88 |

*Primary Examiner*—Daryl W. Cook
*Attorney, Agent, or Firm*—C. A. Phillips

[57] ABSTRACT

A system for reading binary digital data, represented by two possible spacings between abrupt flux reversals appearing on a magnetic track of a credit card, as the credit card is transported by hand by and in engagement with a magnetic head of the system. A read head having an unusually large read aperture is used to translate the two possible encoded lengths into two possible waveform amplitudes which are independent of transport speed. Then, by means of amplitude discrimination, the "0" bits are detected; and by zero slope detection, the "1" bits are detected. Mechanically, the read head is located centrally in an obtusely angled long side of a housing and is opposed by a contoured Teflon pillow that substitutes for one-half of the usual card slot. This unidirectional pillow is shaped and spaced from the head so as to cause the credit card to be slightly bent around the head's face in passing.

4 Claims, 7 Drawing Figures

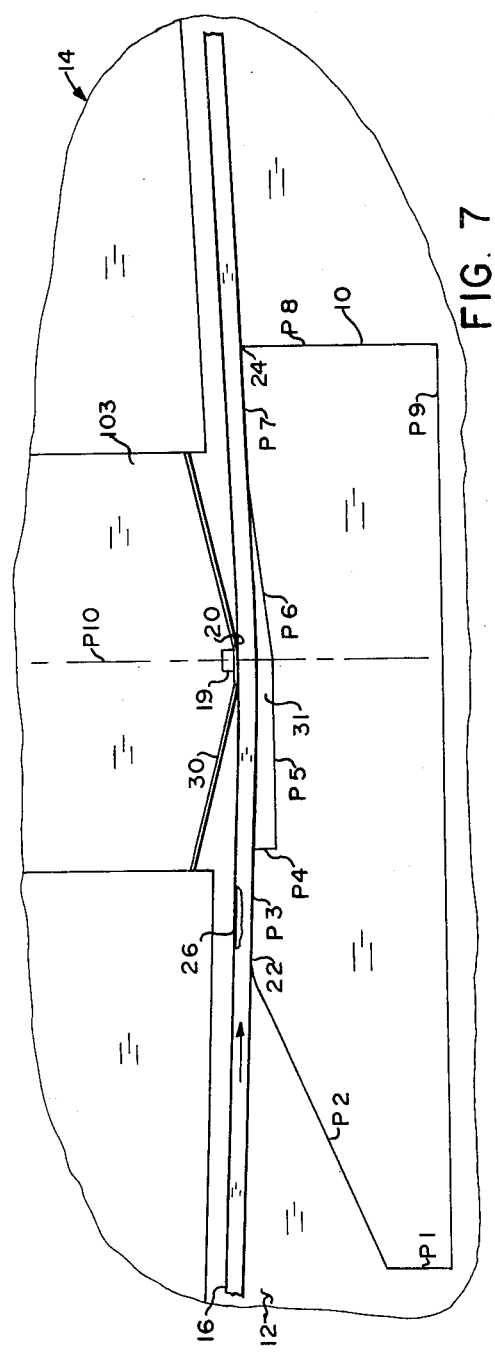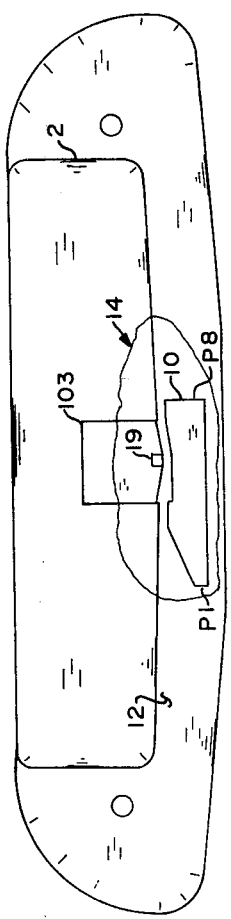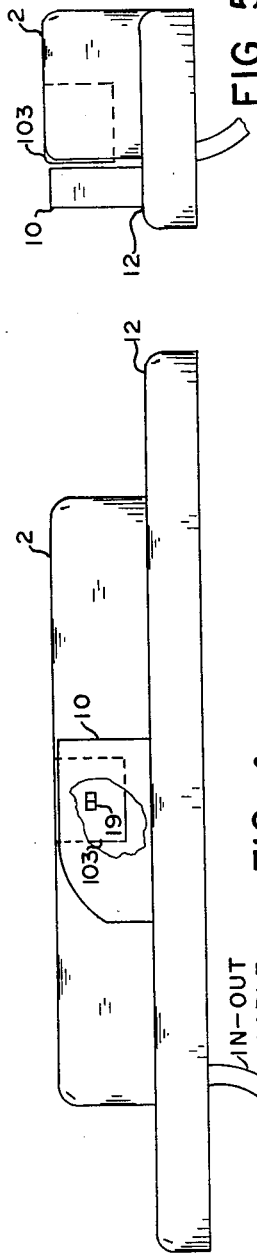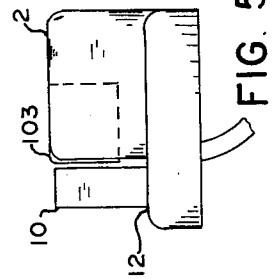

DIGITAL CODE READER

This is a division of application Ser. No. 772,081 filed Feb. 25, 1977 now U.S. Pat. No. 4,141,494.

BACKGROUND OF THE INVENTION

1. Field of the Invention

This invention relates to binary code reading and decoding devices and systems, and particularly to a reader for accurately decoding magnetically recorded binary codes at varying reading speeds.

2. General Description of the Prior Art

Magnetic recordation of digital information on credit cards has increased enormously in the past few years. With this increase, there has occurred a substantial increase in the demand for readers for such recordings, particularly for retail and banking establishments. Such a reader must decode the particular magnetic code employed, and as an example, FIG. 3a illustrates perhaps the widest used code, the Aiken self-clocking code. As shown, it typically employs an initial set of 8 to 10 magnetically encoded "0's", each having a physical length on the card of 13 ⅓ mills, and after which there follows binary encoded data wherein "0's" are the indicated length "L", and "1's" are a pair of lengths half this length, each 6 ⅔ mills. In order to effect reading of a card, the card must be moved through the reader with a magnetic head or heads of the reader in engagement with the magnetic track of the card, and this is accomplished on some readers by means of an automatic transporter; and on other readers it is simply performed by moving the card through the reader by hand. Where done automatically, the speed of movement of the card is of a constant and known speed, and thus the different length encoded pulses may be time-base detected, minimizing the electronic circuitry problem. On the other hand, the machanical hardware required adds complexity to the reader, and this in turn makes it somewhat costly and maintenance prone. Hand-operated devices on the other hand have heretofore required more complex electronic systems in order to detect different interflux reversal times without some reference, such as speed of movement of a card. One such system employs an electronic clock and two counters, and clock pulses are counted for each succeeding period between flux reversals. By comparison of succeeding counts, different time periods between magnetically encoded pulses may be discriminated and thus decoded. The difficulty with this system is that because of the extremely wide speed variations in hand transported cards (1.5 to 40 inches per second), quite high clock pulse rates and many stages in the dual counters are necessary to achieve accuracy, so this has resulted in a fairly high cost for this type of system. A proposed system, which the applicant earlier implemented and discarded because of cost, utilized a compound head equivalent to two reading transducers, both placed upon the track to be decoded, but slightly displaced along the track. Length domain decoding was then accomplished by various auto-correlation methods using these two length displaced signals.

Another problem with the present systems is that of mechanically coping with deformed cards and providing an apparatus which reliably maintains the card in contact with the reading head of the reader during the transport of the card through the reader. The conventional approach is to provide a floating spring biased guide or wheel which urges a credit card into continuous contact with the head. The difficulty with this approach has been wear of moving parts and guide surfaces that scour the card's signature area. It is clear that reliability could be significantly improved if spring arrangements and moving parts in general could be reduced or eliminated.

Accordingly, it is the object of this invention to provide an improved reading-decoding system which is both mechanically and electronically simpler than that which now exists and which can be fabricated at a significantly lower cost.

SUMMARY OF THE INVENTION

As suggested above, the system of this invention is particularly adapted to decode self-clocking codes and will be particularly described with respect to a system for decoding the Aiken two-wavelength, coherent phase code magnetically recorded on credit cards and where decoding is to be accomplished without reference to the speed of transport as where a credit card is operated through the system by hand, thus where the speed of reading is uncertain and variable.

This system decodes by discriminating the recorded lengths between magnetization reversals, whereas systems now in use decode by discriminating the adjacent time periods between passing magnetization reversals. This changeover in decoding parameters is fundamental as the card's track per se has only lengths and not times recorded on it. This system thereby operates independently of the greatly varying speed and acceleration of manual card transport.

Length discrimination would ordinarily require some device to specifically measure card distance travelled between magnetization reversals. However, this function is here incorporated into the track reading transducer by causing it to have a large effective aperture so that it responds not only to the card's magnetization directly opposite the transducer, but also to that magnetization appreciably ahead and behind that point. This results in an unusual transducer-output waveform which has directly translated the two wavelengths recorded into two possible peak amplitudes. Translated-length decoding is then accomplished by combining amplitude discrimination and zero slope detection methods. Thus, translated-length decoding is allowed by virtue of the special transducer's waveform filtering in the length domain—a kind of waveform alteration unobtainable by usual time domain filtering when card transport speed is unknown.

Mechanically, the reader-decoder has a low profile housing for the electronics and transducer. The transducing read head is located centrally in an obtusely-angled long side of the housing and is opposed by a contoured pillow that substitutes for one-half of the usual card slot. This unidirectional pillow is shaped and spaced from the read head so as to cause the properly directed credit card to be slightly bent around the head's face is passing. Thus, the transported card itself acts as a propagating spring to hold its magnetic track against the face of the reading head.

SPECIAL TRANSDUCER

A special transducer of the card's magnetization-to-voltage is employed which translates the two possible recorded lengths into two possible peak amplitudes in the transducer's output waveform. This translation is accomplished by causing the transducer to have a large effective aperture so that it responds not only to the card's magnetization directly opposite the transducer, but also to that magnetization appreciably ahead and behind that point.

The small effective aperture of conventional transducers causes them to respond to nearly all of the spectral wavelength components of the card's reversing magnetization. As the recorded magnetization consists of abrupt reversals from one saturated polarity to the other, the waveform from a conventional magnetization-to-voltage transducer is simply a two-valued rectangular waveform which provides no clue to card distance travelled between transitions. (The fact that wire-wound transducers produce an output proportional to the rate of change of magnetization rather than magnetization directly will be treated later.)

However, if the effective aperture of the reading transducer is suitably widened, the output waveform degrades into one in which essentially only the fundamental components of the encoded spectrum remain. This is illustrated by FIG. 3 where FIG. 3a shows the recorded magnetization, and by FIG. 3c' which shows the output waveform of a wide aperture transducer. This output contains essentially only the fundamental components of the recorded magnetization. Note that the waveforms are plotted along an axis of card distance rather than time. Also note that the two possible lengths of encoded magnetization have been translated into two possible peak amplitudes in the waveform shown in FIG. 3c'. This is a necessary result of this chosen aperture because it filters in the length domain such that it has a greater resolution response to long wavelengths than to short ones—the same effect that essentially removed the shorter wavelength components. In FIG. 3c', a particular effective aperture has been chosen which causes a 2:1 ratio between the two possible peak amplitudes—a convenient ratio for translated-length discrimination by setting an amplitude threshold at, say, $\pm\frac{3}{4}$ of the largest peak values of a waveform as in FIG. 3d.

SUITABLE EFFECTIVE APERTURE

Determination of an effective aperture that will produce said desired waveform is best done experimentally. It is necessarily scaled to the two distances of encoded magnetization, or more specifically, to the longer of the two encoded distances. This longest distance is the encoded bit length as the Aiken code requires a reversal of magnetization in the middle of a bit length for an encoded data "1" and the absence of a reversal within a bit length for an encoded "0".

It has been found, both experimentally and theoretically, that the desired effective aperture can be obtained by using a gap between the transducer's magnetic pole pieces of about 67 percent of the encoded bit length. If the gap is reduced to, say, 10 percent of the bit length, the difference between the peak amplitudes may become too small to easily discriminate between them; and if it becomes 100 percent of the bit length, the output for encoded "1's" becomes zero. Thus, an effective aperture greater than about 10 percent and less than 100 percent of the encoded bit length to be read may be usable for this system.

STANDARD HEADS MODIFIED

A conventional or standard head can be modified for this system. The effective aperture of a conventional card reading head is preferably about 3 percent, but sometimes up to about 10 percent of a bit length. For purposes of this system, it can be easily increased to effectively 67 percent by at least two methods. It can be mounted with an intentional azimuth-angle error such that the leading corner of the pole piece gap is 67 percent of a bit length from the trailing corner of the pole piece gap. Alternately, a narrow gap head can be spaced away from the card's magnetic track by typically 22 percent of a bit length to increase its effective aperture to the desired 67 percent of a bit length. This is conveniently done by simply applying a durable and non-magnetic film of suitable thickness onto the face of the narrow gap head. This latter method is preferred for two reasons. A self-adhesive tape, such as Teflon, may be applied that not only reduces friction, but prevents wear directly on the head's reading face. Should the tape eventually wear, it can be simply replaced. Also, as the tape is already spacing the track away from the face, any unintentional extra spacing due to card unevenness or a high speed air cushion will have less effect because the percentage change in overall spacing is now considerably reduced.

Another advantage of the increased effective aperture is that any fine transverse scratches in the magnetic track are now less apparent in decoding as the short wavelength components they produce are greatly attenuated, i.e., averaged out in the larger aperture.

COPING WITH THE RATE-OF-CHANGE HEAD

The least expensive and most common card reading heads are of the type which simply wind many turns of wire on the gapped pole pieces. Then the output voltage is proportional to the time-rate-of-change of magnetization rather than magnetization directly. Thus, they are operating in the time domain.

This is of little consequence in this system because the output of such heads may be electronically integrated to produce the desired signal. Such simple time base integration exactly cancels the head's time-rate-of-change response and then allows said length domain decoding. Thus, a wire wound head with a suitably large effective aperture, when combined with electronic signal integration, is equivalent to said magnetization-to-voltage transducer in all respects except one--the constant of integration is unknown. This simply means that the value of the waveform's baseline is unknown, and this must be considered when setting the $\pm\frac{3}{4}$ peak amplitude thresholds for translated-length discrimination. This is easily solved by scaling these thresholds between the waveform's largest positive and negative peaks rather than relative to its baseline.

As the unknown baseline of integration may drift during a card reading, and hence also its peak levels, it is desirable to adapt these $\pm$discrimination thresholds during a card reading. This adaptation or readjustment needs to be done on a per cycle basis (length domain) rather than a time basis.

In practice, such corrections for baseline drift would still be required for Hall effect or magneto-resistive type transducers, but the signal integration would not.

BRIEF DESCRIPTION OF THE DRAWINGS

FIG. 4 is a side view of the mechanical construction of a head assembly and housing for the head and electronic circuitry as contemplated by this invention.

FIG. 5 is an end view of the head assembly shown in FIG. 4 viewed from the card exit side of the assembly.

FIG. 6 is a plan view of the head assembly shown in FIGS. 4 and 5.

FIG. 7 is an enlarged partial plan view of a head assembly and illustrating the position of a credit card between a reading head and supporting pillow.

DETAILED DESCRIPTION OF THE DRAWINGS

Figure 1:
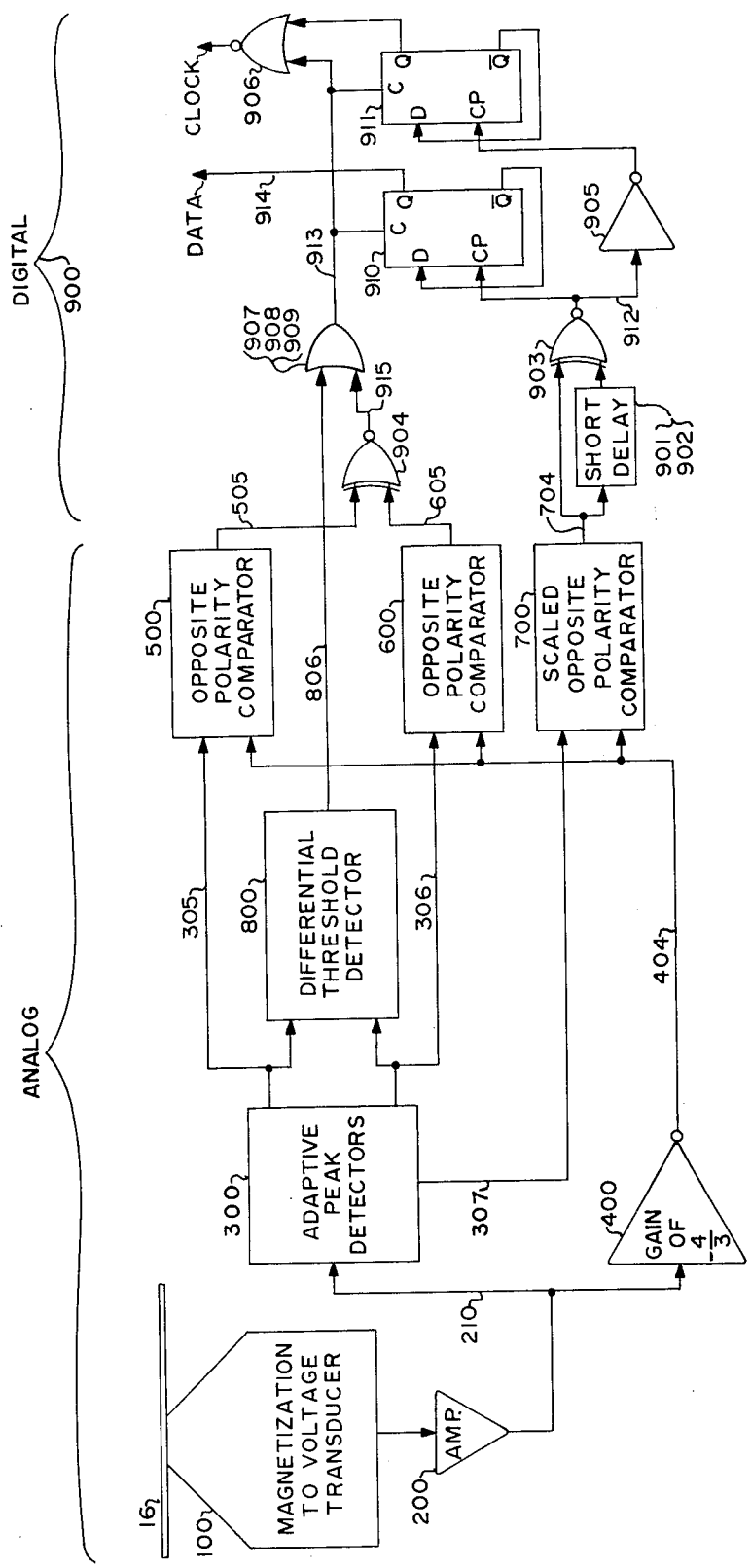
FIG. 1 is a functional block diagram of an embodiment of the system of this invention.

FIG. 1 shows a typical functional block diagram of the system. Each analog function or means for performing that function has been assigned a separate one hundred series number for identification. Other figures will then identify particular parts or signals within that function by using numbers within that one hundred series of numbers.

Figure 3:
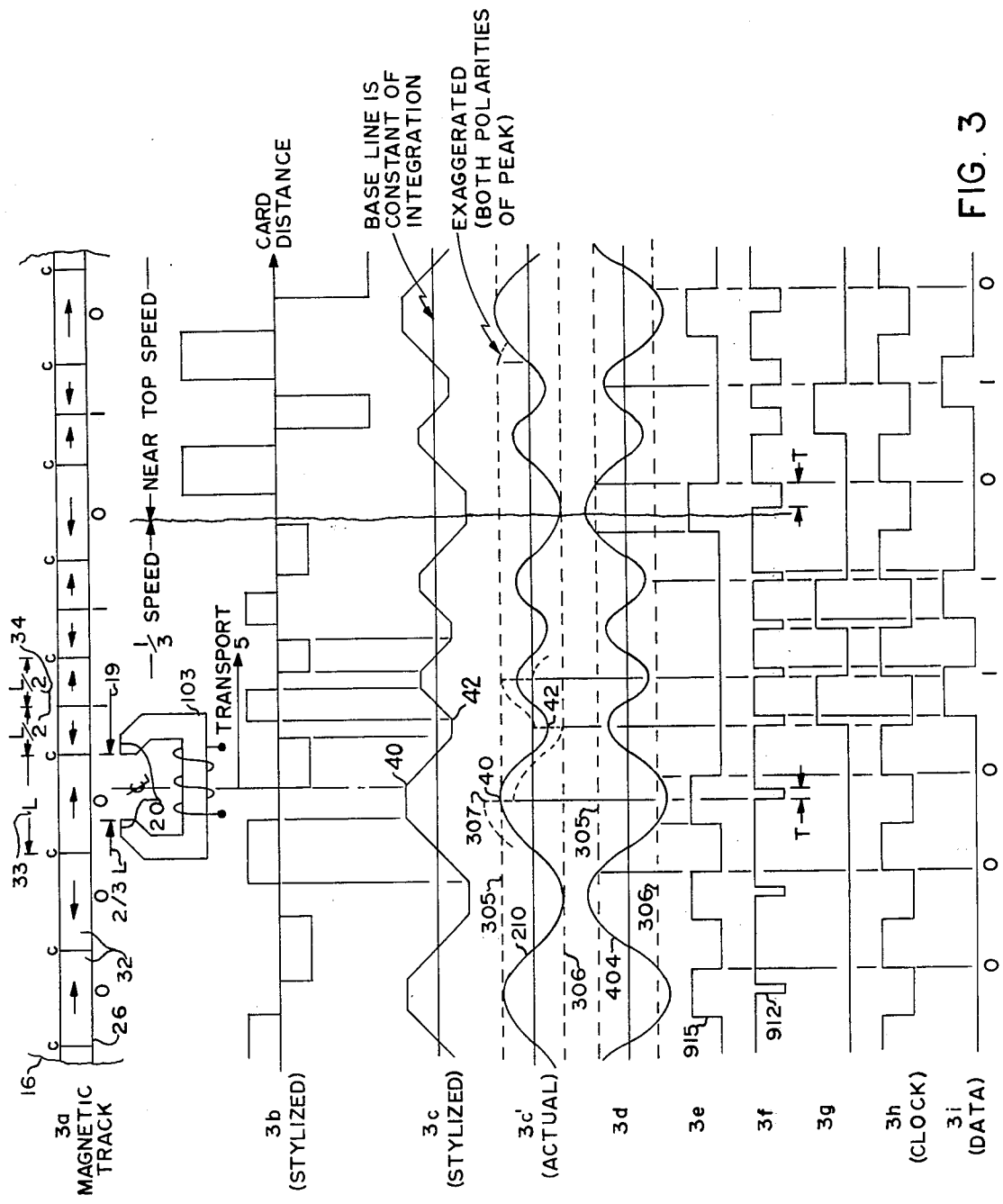
FIG. 3a is the card's recorded magnetic track.
FIGS. 3b–3i are waveforms illustrating aspects of the operation of the systems shown in FIGS. 1 and 2.
Figure 2:
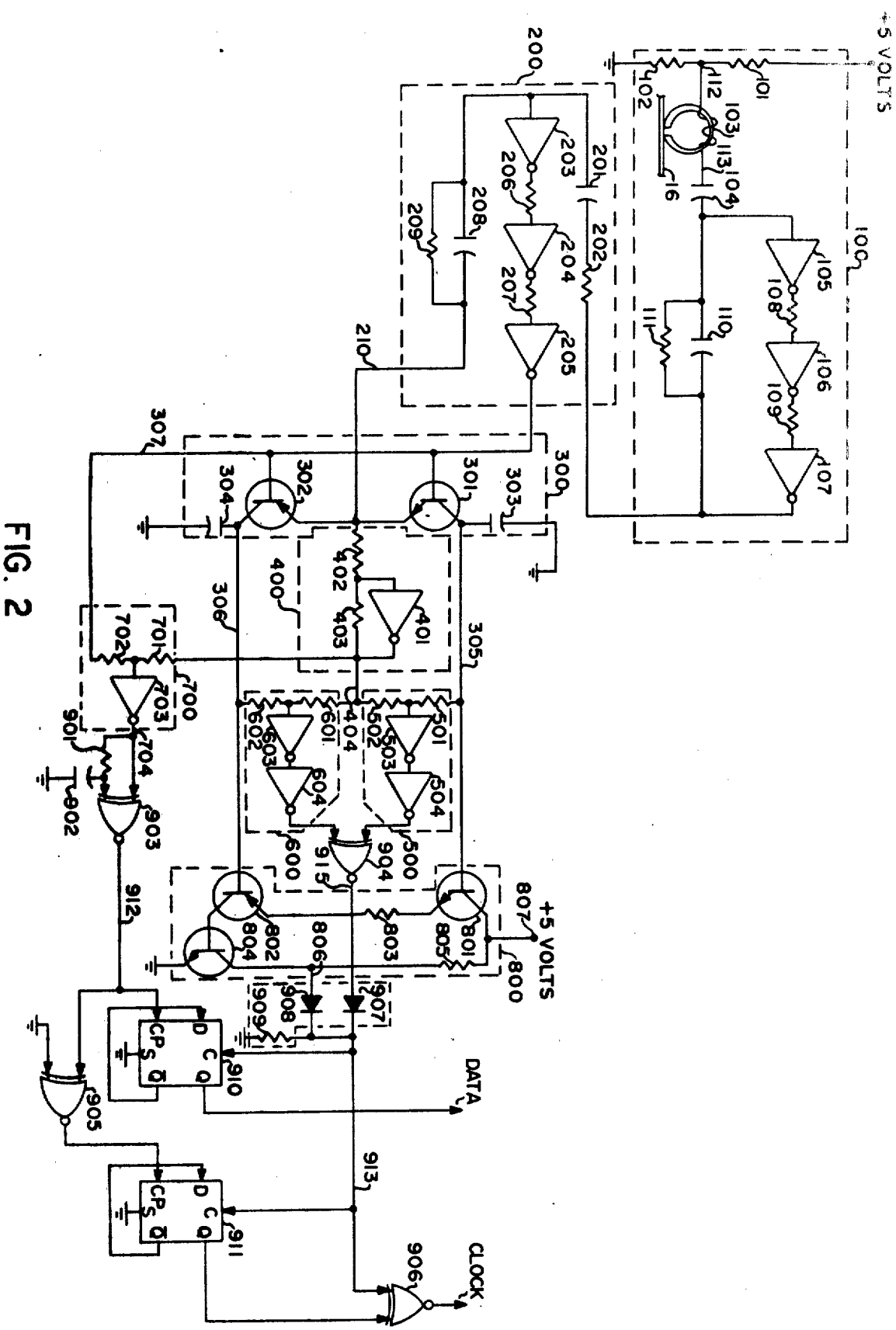

In FIG. 1, item 16 is the magnetically encoded card moving in a guide past transducer 100. Function 100 is a wide aperture direct magnetization-to-voltage transducer, as stipulated, which translates the two card-recorded wavelengths into a voltage waveform having two possible peak amplitudes, as shown in FIG. 3c'. Function 200 simply amplifies this signal to a convenient level for processing by functions 300 and 400. Function 300 contains two adaptive peak detectors which provide two output voltages 305 and 306 (FIG. 3c'), one equal to the positive peak, and one equal to the negative peak of the larger of the two possible amplitudes of signal 210. Function 400 simply amplifies signal 210 by four-thirds and inverts it. Its output 404 (FIG. 3d) is applied to all three opposite polarity comparators 500, 600, and 700. Comparator 500 compares this signal with the positive peak detector output to produce the digital signal 505, "M > +$\frac{3}{4}$", i.e., magnetization is greater than three-fourths of the positive peak. Comparator 600 compares signal 404 with the negative peak detector output to produce the digital signal 605, "M < −$\frac{3}{4}$". EXCLUSIVE NOR gate 904 receives both of these signals to produce signal 915 (FIG. 3e) which, by virtue of this gate's exclusive function, produces a positive pulse for each encoded "0". This output of 904 is applied to dual input OR gate units 907, 908, and 909, along with a muting signal 806 from 800. Digital muting signal 806 is at its low level during a reading operation, and so signals 915 and 913 are then identical and are applied to the C (clear) terminals of both flip-flops 910 and 911 to inhibit (override) their changing state during a recorded "0".

Function 700 compares the inverted signal 404 with a compound signal 307 (FIG. 3c') from the peak detectors. This compound signal contains waveform 210 plus (transistor turn-on) transitions at each zero slope point of waveform 210. Thus, when comparator 700 subtracts an inverted version of waveform 210, namely 404 from compound signal 307, the result 704 is a digital signal which changes state at each zero slope point of waveform 210. This 704 signal is applied directly and also via the delay of 901 and 902 to the inputs of EXCLUSIVE NOR gate 903. This produces signal 912 (FIG. 3f), consisting of short low level pulses beginning at each zero slope point of waveform 210. These 912 pulses are applied to the clock pulse (CP) inputs of the flip-flops, directly to the data producing flip-flop 910 and via inverter 905 to the (sometimes) clock producing flip-flop 911. The system's clock output signal (FIG. 3h) is finally derived by combining the "Q" output of 911 with "clear" signal 913 in NOR gate 906. The system's data output (FIG. 3i) is the "Q" output of flip-flop 910.

FIG. 3a schematically illustrates an enlarged portion of a recorded magnetic track 26 on a credit card 16 wherein the direction of magnetization of discrete areas of the track are illustrated by arrows 32. The magnetized wide regions 33 are representative of data "0's", and a pair of the narrow width magnetized regions 34 are representative of data "1's". Arrow 5 is indicative of the direction of movement of head 103 relative to card 16, and it will be noted that the head has a spacing or gap 19 equal to two-thirds the width of a wide spaced magnetization region 33. Wide region 33 is also equal to bit lengths L and the spacing of clock transitions C. The narrow width magnetization regions 34 are one-half the width of the wide space magnetization regions. The face or nose 20 of the head's pole piece is actually placed against the card's track 26, but as shown here, it is projected 90 degrees into the plane of the figure to show its scale and position relative to the track.

FIGS. 3b and 3c are idealized or stylized waveforms shown for purposes of illustration, and actual waveforms would not have changes in value or slope as abrupt as shown.

FIG. 3b illustrates the output of head 103 at each engagement position along track 26. The waveform is falling at the position shown for the centerline of the head's gap because the right-hand (leading) edge of the gap is now encountering a recorded reversal of magnetization while the rest of the gap contains no change in magnetization. Just prior to this position, zero change of magnetization was within the gap; and just past this position, a positive-going transition will be within the gap to produce the head output waveform shown.

Note that the amplitude of the waveform of FIG. 3b is three times greater toward the right-hand end of the track where transport speed is represented as three times faster than the first of the track. This is a result of the rate-of-change type head here shown, 103. This speed increase has not changed the widths of the pulses here plotted because the variable (abscissa) is card distance rather than time. This amplitude-proportional-to-speed signal of FIG. 3b becomes the signal of FIG. 3c after time base integration, now a signal of two possible amplitudes independent of speed.

Waveform 3c is illustrative of the direct output, without integration, of a direct magnetization-to-voltage type transducer, e.g., a Hall effect type transducer. This waveform clearly indicates the translation of recorded length-to-signal amplitude as two possible encoded length regions 33 and 34 are translated to two possible signal peak amplitudes 40 and 42. The particular head gap of two-thirds L results in a 2:1 ratio of these amplitudes. Since the effect can be achieved without the step of integration in the one case, it is clear that the length-to-amplitude translated waveform of this invention is clearly caused by this relatively large reading aperture, the gap width, rather than by virtue of integration of the signal from a rate-of-change head.

FIG. 3c illustrates a realistic version of the stylized waveform shown in FIG. 3c where the abrupt slope changes are lost because of finite aspects of the recording and head. The first detection step is that of amplitude discrimination, and it is achieved by setting three-fourths maximum amplitude thresholds by peak detecting both polarities of waveform 210 to provide threshold signals 305 and 306, and then amplifying waveform 210 by minus four-thirds to provide waveform 404 as shown in FIG. 3d. Opposite polarity comparison is explained here with respect to FIG. 1 and is the comparison of waveform 404 with both waveforms 305 and 306 as illustrated in FIG. 3d, and whereby derived signal 915 is obtained as shown in FIG. 3e comprising pulses each time waveform 404 of FIG. 3d exceeds either threshold 305 or 306. These pulses contain the zero bit data.

The required additional information, that of the location of data "1's", can be (and has been) obtained from the baseline crossing of signal 210 (FIG. 3c'); but because of the uncertainties of locating the baseline accurately, it has been found that it is better to detect the points of zero slope of signal 210 as described by functions 700, 901, 902, and 903 to produce signal 912 (FIG. 3f). This waveform contains the needed information missing between data "0's' of waveform 3d. It is used to toggle both flip-flops, waveforms 3g and 3i, whenever they are not being held clear by the data "0" signal 915 (or mute signal 806).

FIG. 3h illustrates the system clock output pulses which are obtained as described above. (These pulses might more accurately be called strobe pulses as they are not time based.)

Figure 2:
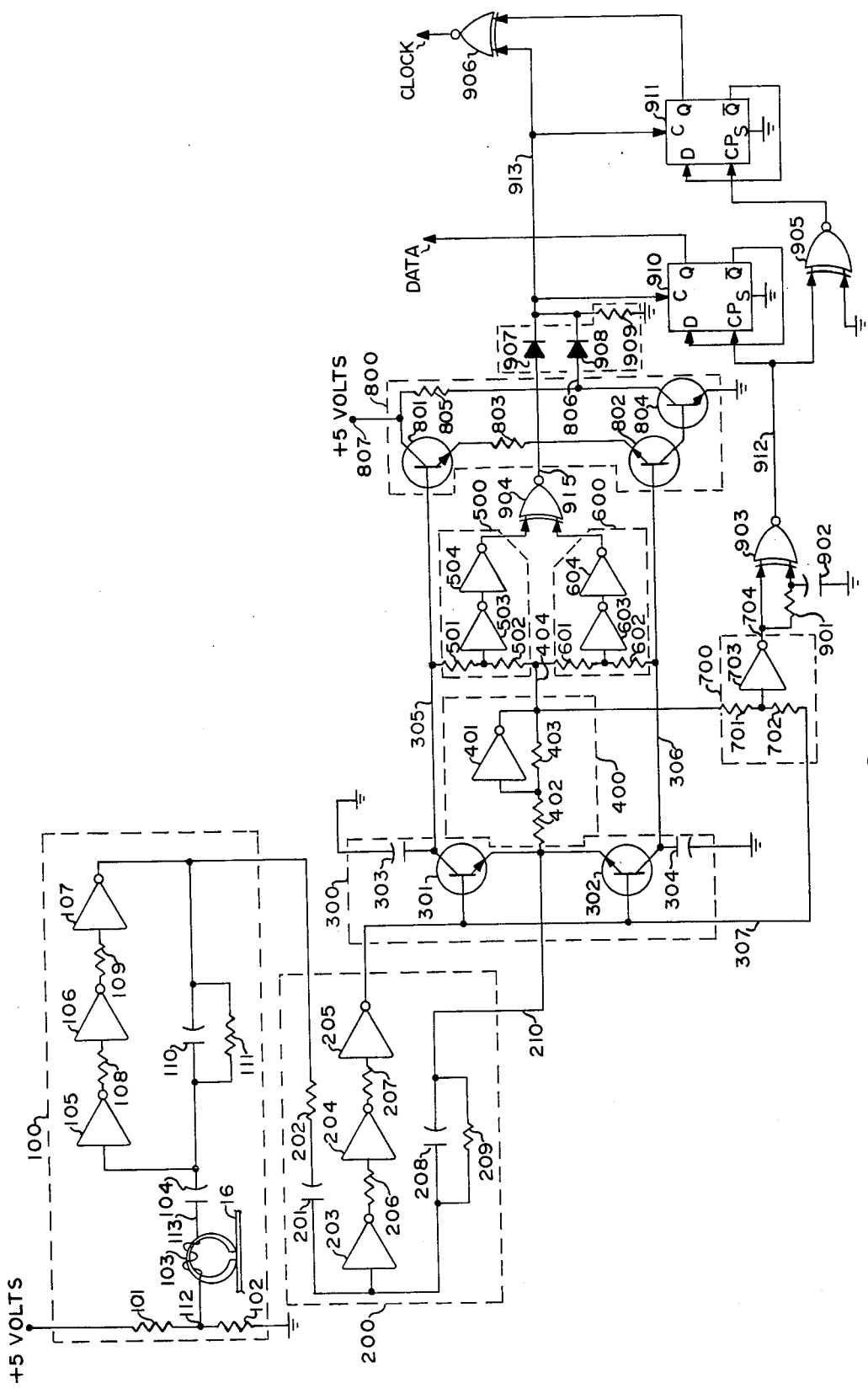
FIG. 2 is an electrical diagram of an embodiment of this invention.

Reference is now made to FIG. 2, which illustrates in greater detail the system shown in FIG. 1. Resistors 101 and 102, connected between a 5-bolt source and ground and being of equal value, provide a voltage of half the supply voltage to terminal 112 of rate-of-change-of-magnetization read head 103. Capacitor 104 connects the head voltage to the input of cascaded inverting amplifiers 105, 106, and 107, interconnected by resistors 108 and 109. CMOS inverters are used for both amplifiers and comparators in this embodiment because of their low cost and large output voltage swing capabilities. This unorthodox use of CMOS inverters is best appreciated if each is considered to be a differential amplifier with only the inverting input terminal available. The non-inverting input terminal may be considered internally returned to a reference potential of approximately one-half the supply voltage. This is the internal crossover potential of the two complementary transistors within each inverter. This crossover potential is essentially the same for all six inverters on the common chip of a standard CMOS hex-inverter. This matching of inverters on a common chip will be used to an advantage, as will be further explained.

Considering inverters 105, 106, and 107 as a single amplification unit, capacitor 110 and parallel connected resistor 111 provide a feedback control for this unit. Resistors 108 and 109, in conjunction with the input capacitance of each inverter, provide compensation within the cascaded amplifier unit to prevent closed loop oscillation of MHz frequencies. At operating frequencies, the parallel source resistance of resistors 101 and 102 and feedback capacity 110 cause the overall amplification to time-base integrate the output of the head signal (as degraded by virtue of the effective aperture discussed).

The output of inverting amplifier 107 is connected through oscillation inhibiting resistor 202 and capacitor 201 to a second amplification unit consisting of cascaded amplifiers 203, 204, and 205. Resistors 206 and 207 interconnect inverting amplifiers 203, 204, and 205, and similarly prevent MHz oscillations within these cascaded inverting amplifiers. The output of amplifier 205 is connected to both bases of the emitter-connected complementary transistors 301 and 302, with the emitters then being connected back to the input of amplifier 203 through parallel-connected capacitor 208 and resistor 209, which provide a controlled feedback for amplification. In this regard, the ratio of input capacitor 201 and feedback capacitor 208 is chosen to provide a voltage gain of 10 at all operating frequencies. The voltage waveform 113 at the output of head 103 is shown in FIG. 3b. The waveform at the base of transistors 301 and 302 is shown as waveform 307, and the voltage waveform at the emitter of these transistors is shown as waveform 210, both in FIG. 3c'. Responsive to waveform 210, as shown in FIG. 3c', transistor 301 is controlled to charge capacitor 303 to the positive peak value via its base-collector diode. Similarly, waveform 210 is applied to transistor 302, causing capacitor 304 to charge to the corresponding peak amplitude value in a negative direction. Just before each subsequent peak in the waveform, each capacitor is slightly discharged by the normal functioning of these transistors since their emitter currents are in quadrature (90 degree leading) with the emitter voltages. This quadrature relationship between emitter current and voltage is established by capacitor 208 being the predominant load to each transistor. The degree of discharge of capacitors 303 and 304, occurring 45 degrees before recharge, is as shown in FIG. 3c', set at approximately one percent by the ratio of capacitor 208 to one of these capacitors. Thus, both levels or waveforms 305 and 306 are adjusted for each new peak of signal 210, provided the new peak value is within one percent of a preceding peak. This adaptive action has been found most desirable to adjust for baseline drifts which may occur during a card reading. It is to be noted that this peak self adjustment is on a per cycle basis in the length domain (per cycle) and independent of time since it is determined by a capacitance ratio.

Waveform 210 is also applied to inverter 401 via resistor 402. The feedback resistor 403 relative to resistor 402 sets the output voltage of this overall amplifier 400 at four-thirds larger than its input signal 210 and is inverted. This inversion and gain sealing sets the amplitude discrimination levels at three-fourths of the peaks when this signal is applied to the opposite polarity comparators 500 and 600 along with one of the polarities of detected peak voltage from one of capacitors 303 or 304.

The two opposite polarity comparators 500 and 600 are otherwise identical. Comparator 500 consists of equal input resistors 501 and 502 which average the two opposite polarity input signals and compares the result with the internal crossover voltage of the complementary CMOS transistors within 503. The extra gain of cascaded inverter 504 simply increases the slope of the transitions in the comparison signal from 503 to provide an essentially digital output to gate 904. Comparator 600 operates likewise.

Thus, one or the other signals, from comparator 500 or 600, is making a transition each time the signal 404 passes through either polarity of the discrimination threshold of three-fourths the peak of signal 404. These digital signals applied to EXCLUSIVE NOR gate 904 result in the output waveform 915 shown in FIG. 3e. This waveform indicates all of the data "0" bits, but provides no indication of the number of data "1" bits intervening.

One form of generating the "1" bits is by generating pulses at each waveform crossing of a baseline and then suitably combining the digital waveforms. However, the (otherwise desirable) deg-gradation of the read head produces enough shift in the local baseline so that certain data combinations cause errors in precisely determining baseline crossings. Accordingly, as one feature of the present invention, the applicant has determined a better method, and this is to produce a narrow pulse beginning at each zero slope point of the waveform rather than at each baseline crossing as these waveform points are relatively less effected by local baseline drift.

At this point, it is to be noted that waveform 307, (FIG. 3c') at the bases of transistors 301 and 302 is a summation of two waveforms: the emitter waveform 210 plus a rectangular waveform having transitions each time conduction shifts from one of these complementary transistors to the other. As the predominant load for these transistors is capacitor 208, these transitions occur at each zero slope point of waveform 210 where capacitor 208 stops being charged in one direction and begins in the other direction. Thus, when suitably scaled resistors 702 and 701, connected between the output of amplifier 400 and the bases of transistors 301 and 302, average this complex waveform with signal 404, there is a cancellation of all the waveforms except the transitions of signal 307. This residual binary waveform is then fed through comparing amplifier 703 directly to one input of EXCLUSIVE NOR gate 903 and also through a time delay circuit consisting of a series input resistor 901 and grounded input capacitor 902 to the second input of EXCLUSIVE NOR gate 903. This delay circuit thus determines the narrow pulse width of the output of EXCLUSIVE NOR gate 903 as shown in FIG. 3f as waveform 912. The time constant (T) of this delay circuit must be chosen short enough so that these pulses do not extend into the other decoding transitions at the highest card transport speed.

The pulses from EXCLUSIVE NOR gate 903 are applied directly to the clock pulse (CP) input of flip-flop 910 and through inverting gate 905 to the CP input of flip-flop 911. Both of these flip-flops are connected to toggle responsive to each rise of their respective CP signals by virtue of each $\bar{Q}$ output connected to the D input. These flip-flops are allowed to toggle only with an encoded "1" by applying signal 915 from EXCLUSIVE NOR gate 904 through diode 907 to the clear (C) input of the flip-flops as an overriding inhibiting signal. As will be further explained, diode 908 is combined in circuit with diode 907 and resistor 909 to form an OR circuit to also cause inhibition when the circuit is not energized by a signal from a card being read.

The Q output of flip-flop 911 is as shown in FIG. 3g as a positive pulse beginning at each zero slope point of a lower amplitude, "1's" represented sinusoid of waveform 210 shown in FIG. 3c and ending at the next zero slope point.

The data waveform from the Q output of flip-flop 910, shown in FIG. 3i, is identical with the waveform shown in waveform 3g except delayed by the width of a zero slope pulse (delay 901 and 902), as shown in FIG. 3f as "T", because it is clocked by the positive-going transition of the zero slope pulse, while the "1" derived output of flip-flop 911 is clocked negative-going transition of the zero slope pulse because of the inversion through gate 905. The clock output signal is the NOR combination of the "Q" output of 911 and signal 915, shown in FIG. 3e, as fed through diode 907, the two signals being combined in EXCLUSIVE NOR circuit 906, and thus the clock output indicated in FIG. 3h is shown as an output of the circuit. EXCLUSIVE NOR circuits are used for both the NOR function 906 and the inverter function of 905 because they are standard CMOS chip leftovers from EXCLUSIVE NOR circuits 903 and 904.

As suggested above, OR diode 908 provides an inhibiting action when a card is not being transported past read head 103. This prevents circuit noise or stray pickup from producing outputs from the unit. As further elements employed to effect this function, complementary transistors 801 and 802 are used, their bases beig connected to ±peak voltage capacitors 303 and 304, respectively, and their emitters being connected together through resistor 803. When the ±peak voltage difference exceeds two emitter-base voltage drops, the collector-emitter circuit of these transistors conduct a current from +5 volts source 807 to the base of transistor 804. Gains are such that peak-to-peak noise is insufficient to turn on 801 and 802 and hence 804, but encoded cards, even with low magnetization, will. Therefore, with a read signal, transistor 804 is turned on, and its collector voltage is pulled down so that diode 908 is turned off, and thus there occurs no inhibition of flip-flops 910 and 911 except as controlled by output 915 of EXCLUSIVE NOR circuit 904. However, without a read signal, transistor 804 is off and resistor 909, connected to the output of both diodes 907 and 908, along with resistor 805 of +5 volts at 807, turns diode 908 on to hold the "clear" inputs of both flip-flops active. This clears both flip-flops so that the Q outputs are forced to a "0" state which mutes or inhibits both outputs, data and clock, when no read signal is present.

It is to be noted that the crossover potential of the CMOS transistors internal to inverter 203 determines the quiescent baseline of waveform 210, and this internal potential is analogous to the return of a non-inverting differential amplifier terminal. Thus, in order for inverting amplifier 401 to operate as an inverter without appreciable baseline shift, and for inverters 503, 603, and 703 to operate as accurate comparators from this common baseline, these four CMOS units must share a common chip. This matching of crossover voltages eliminates the need to actually connect a common reference voltage between functions 200, 400, 500, 600, and 700. The total of 12 inverting amplifiers as used in FIG. 2 requires two standard CMOS hex inverters.

The peak-to-peak voltage of signal 210 is about two volts during operation, and hence signal 404 is 2⅜ volts. These large signal swings are obtained with only a 5 volt supply by virtue of the complementary drive within inverting amplifiers 205 and 401. These peak values are quite large compared to those of noise and differences of crossover voltages within a given inverter chip. All the circuits shown in FIG. 2 are powered at 5 volts and draw only about 6.3 Ma of current. These circuits decode the standard American Banking Association track of credit cards (which use the Aiken self-clocking code) at any card acceleration between 1.5 and 40 inches per second. When a read head is used which is magnetically shielded, the assemblies are markably unaffected by electromagnetic interference. Also, the analog amplifiers are designed to provide a good rejection to supply voltage ripple and come to operating bias quickly after power is applied.

Referring to FIGS. 4–7, there are shown certain mechanical features of an embodiment of this invention. Referring particularly to FIG. 5, it will be noted that housing 2 has an unusually low profile, allowing card 16 to largely extend above housing 2. The low profile of the housing and partial slot provide several advantages. The greater area of the card exposed during manual transport results in less concealment of the card from the card owner and also the operator and allows for a more comfortable grip of the card by the operator. Also, the lower grip that is allowed on the card reduces reading drag torque which tends to tip the trailing base edge of card 16 away from a desired reference plane established by the bottom edge of card 16 on reference base surface 12. Further, the low housing profile prevents scoring of the standard signature panel on credit cards.

As particularly illustrated in FIGS. 6 and 7, card guide or pillow 10 is configured with nine plane vertical sides or surfaces P1–P9, all perpendicular to base surface 12 of head assembly 14 which provides a reference surface for the card's edge. The planes of surfaces P3 and P7, when extended, intersect at plane P10 which is normal to the face of magnetic head 103 at its gap 19 and passes through the gap. Plane surfaces P3 and P7 comprise bearing surfaces for card 16 and form an obtuse angle which is generally bisected by the head's central plane P10, and this angle is less than 180 degrees by typically and approximately 4.8 degrees, 2.4 degrees draft on each side. The spacing between pillow 10 and nose or nose surface 20 of head 103 is such that the nose surface would be 0 to 0.85 inch from a vertical plane extending between the outer edges 22 and 24 of plane surfaces P3 and P7. Plane sides or surfaces P3 and P7, together with the surface of head 103 at nose 20, provide bearing surfaces and cause passing card 16 to be bent through typically 4.8 degrees. Thereby, the plane of the card is bent as a spring to maintain contact between the card's magnetic track 26 and the gap 19 of head 103. Where, as shown, a head spacing medium 30 is used, it would be a bearing surface. As an example, by employment of a Teflon tape or film of a thickness of 0.003 inch as such medium, this effectively widens the aperture of gap 19 of head 103 from an actual width of 0.0005 inch sufficiently to effect the response illustrated in FIG. 3b (where a rate of magnetic change head is employed) or FIG. 3c (where a magnetization responsive head is used).

Three other plane surfaces or sides P4, P5, and P6 connect the pillow bearing plane surfaces P3 and P7 in a generally concave or recessed manner and are arranged so that a card entering in the proper direction is smoothly guided through, but a card entering in the wrong direction is forced into and stopped by surface P4, which effects an abrupt indentation between plane sides P3 and P5 of 0.010 to 0.085 inch.

The remaining four vertical sides, sides P1, P2, P8, and P9 of pillow 10, generally function to complete the closed form of the pillow, except that surface P2 is tapered or flared as an entrance face to guide the leading edge of the card to a leading bearing surface P3.

The generally indented or concave region 31, opposite to the head and nose, allows a reasonable tolerance to occur in the pillow-to-head spacing and in card thickness without binding the card's transport. The generally plane-to-plane bearing surfaces P3 and P7 provide sufficient area so that pillow wear is generally insignificant. These bearing surfaces are both of tough and low friction material, typically an ultra high molecular weight polyolefin.

In the foregoing manner, the unidirectional card guide assembly is achieved having absolutely no moving parts or springs, and the card being read and transported itself acts as a propagating spring for the system.

The electronic components of the system described above (FIG. 2) may be totally positioned in housing 2 and thereafter epoxy or the like applied, filling the cavity, and thus sealing and protecting the electronic circuitry.

Having thus described my invention, what is claimed is:

1. A magnetic transducer assembly for detecting a magnetic code recorded on a magnetic track on a thin, rigid, but bendable plastic card as such a card is passed through said assembly along a selected line of direction comprising:

a magnetic detection head having a generally convex curved responsive face surface positioned along said line of direction; and a guide member comprising:

separated entrance and exit lengths of bearing surfaces positioned and spaced from said surface of said magnetic detection head, and each said bearing surface lying in a discrete plane, wherein extensions of planes of said bearing surfaces form an obtuse angle at a line in a plane normal to and centrally through said surface of said magnetic detection head;

whereby a card moved along said line of direction is bent by virtue of engagement with the combination of said entrance bearing surfaces, said surface of said head, and said exit bearing surface, causing said card to be maintained in frictional contact with said magnetic detection head.

2. A magnetic transducer assembly as set forth in claim 1 wherein said guide member includes means for blocking the movement of said card through said assembly along a line of direction opposite to that of said selected line of direction.

3. A magnetic transducer assembly as set forth in claim 2 including a recessed region in the region of separation between said entrance and exit bearing surfaces, and said means for blocking comprises an abrupt indentation between said entrance bearing surface forming one side of said recessed region, and there being a gradual indentation comprising an opposite side of said recessed region and which connects to said exit bearing surface.

4. A magnetic transducer assembly as set forth in claim 1 wherein:

said card has a thickness of 0.003 to 0.090 inch; and the spacing between said head, measured along said plane normal to and centrally through said surface of said head, and a plane extending between an entrance edge of said length of entrance bearing surface and exit edge of said exit bearing surface is 0 to 0.085 inch.

* * * * *

UNITED STATES PATENT AND TRADEMARK OFFICE
CERTIFICATE OF CORRECTION

PATENT NO. : 4,254,441

DATED : March 3, 1981

INVENTOR(S) : Alan J. Fisher

It is certified that error appears in the above-identified patent and that said Letters Patent is hereby corrected as shown below:

Figure 2 should appear as shown on the attached sheet.

*Signed and Sealed this*

*Twenty-ninth* Day of *March 1983*

[SEAL]

Attest:

GERALD J. MOSSINGHOFF

*Attesting Officer*  *Commissioner of Patents and Trademarks*